United States Patent [19]
Brown

[11] Patent Number: 5,092,960
[45] Date of Patent: Mar. 3, 1992

[54] METHOD FOR DRYING SUSPENSIONS OF ORGANIC SOLIDS IN WATER

[76] Inventor: Robert E. Brown, 2857 Chateau Cir., Columbus, Ohio 43221

[21] Appl. No.: 440,173

[22] Filed: Nov. 22, 1989

[51] Int. Cl.$^5$ .......................... B01D 1/18; B01D 3/42
[52] U.S. Cl. ....................................... 159/48.1; 34/10; 34/26; 34/30; 34/57 D; 34/57 R; 34/181; 159/4.04; 159/4.2; 159/16.1; 159/DIG. 3; 202/236; 203/49; 203/90; 426/658
[58] Field of Search ................. 159/3, 4.04, 4.2, 16.1, 159/48.1, DIG. 3; 202/236; 203/49, 90; 427/425, 213; 34/10, 26, 30, 57 A, 57 D, 57 R, 181, 211; 426/658, 656, 601

[56] References Cited

U.S. PATENT DOCUMENTS

| | | | |
|---|---|---|---|
| 3,539,454 | 11/1970 | Tufo | 159/DIG. 3 |
| 3,547,179 | 12/1970 | Hussman | 159/DIG. 3 |
| 3,615,723 | 10/1971 | Meade | 426/294 |
| 3,735,792 | 5/1973 | Asizawa et al. | 159/DIG. 3 |
| 3,748,103 | 7/1973 | Bean et al. | 159/DIG. 3 |
| 3,795,058 | 3/1974 | Ganiaris | 159/DIG. 3 |
| 3,969,546 | 7/1976 | Saeman | 423/474 |
| 4,048,351 | 9/1977 | Saeman et al. | 423/474 |
| 4,203,228 | 5/1980 | Aradi et al. | 34/10 |
| 4,244,776 | 1/1981 | Nöltner et al. | 159/DIG. 10 |
| 4,294,624 | 10/1981 | Veltman | 159/DIG. 1 |
| 4,351,849 | 9/1982 | Meade | 426/294 |
| 4,370,198 | 1/1983 | Dencs et al. | 159/DIG. 3 |
| 4,490,403 | 12/1984 | Pisecky et al. | 159/DIG. 3 |
| 4,561,192 | 12/1985 | Meade | 159/DIG. 3 |
| 4,784,878 | 11/1988 | Haak | 159/4.09 |

Primary Examiner—Virginia Manoharan
Attorney, Agent, or Firm—Sughrue, Mion, Zinn, Macpeak & Seas

[57] ABSTRACT

Distillers syrup or similar liquid solutions or suspensions of organic solids and oil and water is dried to obtain granular solids with improved syrup content by continuously spraying the syrup or liquid onto the upper surface of a previous bed of granular solids while passing air through the previous bed to dry the syrup from the bottom of the bed upwardly. The upper surface layer of the previous bed is maintained at near saturation temperature of the air entering the bottom of the bed due to the cooling effect of evaporation. The syrup or liquid is continuously mixed into the upper surface layer of the granular solids to significantly increase the dried syrup or liquid content. The bottom layer of the graular solids is continuously cut and continuously removed. The bed is rotated relative to apparatus for spraying the syrup or liquid onto the bed, apparatus for mixing the syrup or liquid into the granular solids, apparatus for cutting the bottom layer of the granular solids and apparatus for removing the cut bottom solids from beneath the bed.

9 Claims, 6 Drawing Sheets

METHOD FOR DRYING SUSPENSIONS OF ORGANIC SOLIDS IN WATER

FIELD OF THE INVENTION

This invention relates to methods and apparatus of the fixed or rotating bed dryer type to dry distillers syrup or for drying similar solutions or suspensions of organic solids and oils in water to obtain granular solids, for example milk whey and other wastes from the dairy industry, to obtain an animal feed product.

BACKGROUND OF THE INVENTION

Distillers syrup is a solution or suspension of corn protein and corn oil in water which can be dried to obtain an animal feed product. Distillers syrup is often blended with distillers grains and dried in a rotary steam tubed dryer. A disadvantage of this method is the limit of about 50% dried syrup in the blended product of the dried distillers grains and the dried syrup or DDGS. Additional syrup applications cause the solids to adhere to the surfaces of the dryer. Another disadvantage of the conventional method is the high capital cost.

Alternatively, distillers syrup may be dried using a rotary drum dryer. Careful control is required to avoid overheating the product with a loss of protein content. Further, these driers require high capital cost.

Solutions and suspensions of organic solids in water may also be dried using either a fixed bed dryer or a rotating bed dryer. Representative patents directed to such process and apparatus are U.S. Pat. Nos. 3,309,782 to Ellis; 3,416,239 to Louks, and 4,217,701 to Mathews.

Ellis discloses a method and apparatus for drying grain in which the grain is loaded on a perforated floor of a cylindrical container with the grain spread to form a layer of a certain depth having a concave contour to the upper surface of the layer. Heated air is forced upwardly through the perforated floor and layer of grain, and the grain is removed when it is dried to a predetermined average moisture content.

Louks treats granular material in a cylindrical storage bin having a lower floor and an upper perforated floor forming upper and lower compartments. A sweep auger is movably mounted on top of the perforated upper floor for moving granular material therein to apertures permitting the granular material in the upper floor to be dumped from the upper compartment into the lower compartment. An evacuating conveyor is provided within the lower compartment including an auger mounted below the lower floor for removing material and a second sweep auger movably mounted on the lower floor for moving granular material on that lower floor to the evacuating auger. Heated air is supplied below the upper floor for perculation through the granular material within the upper compartment.

Mathews discloses a bin grain dryer similar in some respects to that of Louks, but utilizes a perforated lower floor and a perforated upper floor. The first perforated floor carries a substantial column of moist grain which is subjected to the passage of hot air moving upwardly through the perforations for drying the grain. An auger sweep arranged within the upper chamber removes portions of the grain lying closest to the surface of the perforated upper floor and discharges that grain downwardly through a passageway in the first floor for distribution uniformly over a substantial column of grain carried on the second floor. The second floor has cooling air passed through its perforations. An auger sweep arranged to remove portions of the grain closest to the surface of the perforated lower floor, discharges that grain downwardly through a central passageway for deposit on a radially disposed conveyor in a bin below the second perforated floor to deliver the grain radially out of the cylindrical bin.

While the apparatus of the three patents described above facilitates the drying of granular material, particularly grain, and while such apparatus incorporates elements necessary to the practice of the method and apparatus of the present invention, such apparatus is not cognizant of the problem of the limitation of blending distillers syrup with distillers grains and drying of the same in a rotating or fixed bed dryer to enable a significant increase in the percent of dried syrup in the blended product of dried distiller grains and dried syrup, DDGS.

It is therefore a primary object of the present invention to provide an improved fixed or rotating bed dryer to enable drying distillers syrup or like solutions or suspensions of organic solids in water or other liquid to obtain granular solids, and the method of achieving the same in which the dried distillers syrup content may be significantly increased, the cost of the apparatus and process kept relatively low, where dust emissions are eliminated, and the process and apparatus is easily controlled.

DESCRIPTION OF THE PREFERRED EMBODIMENT

Figures 1, 2:
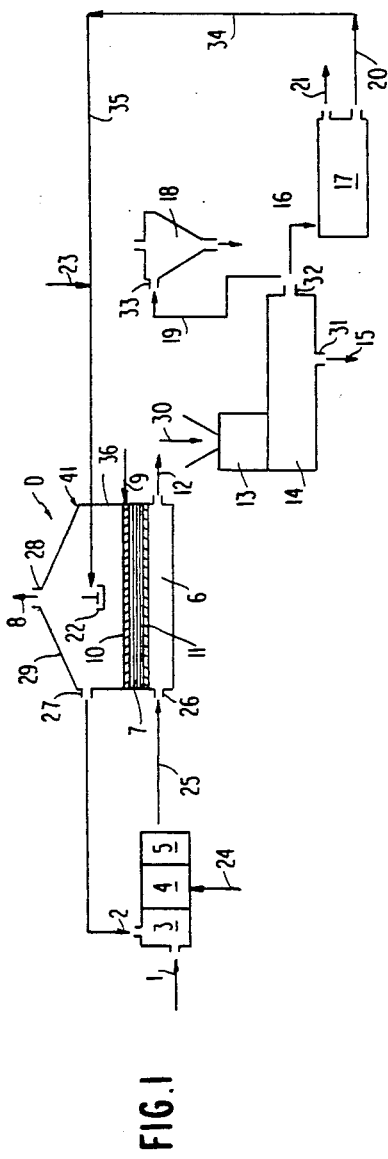
FIG. 1 is a process flow chart illustrating the apparatus of the present invention for use with either a fixed bed dryer, FIGS. 2–3, or by substitution of a rotating bed dryer, as further illustrated in FIGS. 4–8, inclusive.
FIG. 2 is a partial schematic, vertical sectional view of the fixed bed dryer forming a principle component of apparatus of FIG. 1.

Prior to a discussion of the content of FIG. 1 and the method or process of the claimed invention as it applies to both a rotating bed or fixed bed dryer, a fixed bed dryer is generally constituted as a vertical, cylindrical bin with a perforated floor beneath and supporting a bed of granular solids. Drying air introduced beneath the floor moves through the perforated floor into the bed of solids leaving the top of the bed saturated with water. Typically the bed may be 24 feet in diameter by 1 foot deep. Using such bed, distillers syrup may be dried on a bed of granules composed of dried distillers grains with syrup (DDGS). Alternatively, dairy waste and whey may be dried using a bed of wheat bran granules or dried milk waste granules with the liquid applied to the upper surface of the bed.

The general advantage of the fixed bed dryer is the stability of the protein content of the product. A fixed bed dryer may use relatively low drying temperatures because of the large surface area for the interaction of the moving air and moist surfaces. Incoming air 50° to 60° C. is quite satisfactory for drying distillers syrup on distillers grains. Most of the drying occurs in a layer at the top of the bed where the temperature approaches the wet bulb temperature of the incoming air. Moisture content as low as 7% may be obtained in the dried product. The protein of the dried syrup is stable under these temperature conditions. The same is true of the rotating bed dryer as described in conjunction with the embodiment set forth in FIGS. 4-8 inclusive.

Further, in both embodiments of the invention the low temperature at the surface of the bed helps in controlling odors associated with the drying process. Using the present invention, the saturated air leaving the top of the bed is about 25° to 30° C. Many volatile acids and odor-causing vapors which are emitted when drying with other dryers operating at higher temperatures remain with the dried solids in accordance with the present invention, both in the fixed bed dryer and the rotating bed dryer.

Referring to the process flow chart as shown in FIG. 1, using a fixed bed dryer indicated generally at D, the air necessary for drying is a mixture of ambient air indicated by arrow 1, and air exhaust indicated by arrow 2 from the dryer D which is blended by electronically controlled dampers 3 to maintain a steady wet bulb temperature as the air enters a steam coil 4. A blower 5 is employed to force the heated air exiting from the chamber surrounding steam coil 4, as indicated by arrow 25, for passage through an air inlet duct 26 to an air plenum chamber 6 beneath bed 7 of drying granules. Saturated air leaves the surface of the bed of granules and is either recycled to damper 3 via outlet duct 27 as indicated by arrow 2 constituting the air exhaust, or the saturated air is exhausted to the ambient at 8 through a central exhaust ambient discharge duct 28 within the roof 29 of dryer D.

If necessary or desirable, the saturated air may be directed to a scrubber (not shown) to remove odors via ambient exhaust or discharge duct 28. A scrubber may also be employed to remove volatile acids from the saturated air stream which is recycled to the damper at 2. The temperature of the warm air is held steady by regulating the steam flow, indicated by arrow 24, into the steam coil 4. The liquid to be dried is first concentrated to a syrup by conventional evaporating methods (not shown). The syrup indicated schematically by arrow 9 is sprayed onto the surface of the granules and mixed into the bed of granules by one or more mixer-sprayers 10 which travels in a circle around the central vertical axis of the dryer D.

Solid granules 12 are removed by the cutter auger 11 and transported to a mill 13 as indicated by arrow 30, and thence to an underlying screen 14 where the meal indicated schematically at 15 is removed through a screen outlet duct 31. Elsewhere, at 32, which connects the screen to the aspirator 18 via inlet duct 33, dust as indicated schematically by arrow 19 is removed from the coarser granules 16. The coarser granules also exit at 32 and flow to bin 17. The coarser granules may be 5 to 15 mesh, in contrast to the meal, which is removed as the final product at 15.

Selective coarse granules 20 are transported as indicated by arrows 34, 35 to a spreader 22 internally of the fixed dryer D. and thus returned to the top of the bed 7, as required for efficient drying. The granules are of sufficient size to fall to the bed surface instead of being carried from the bin by air currents. The remaining coarse granules 21 are preferably added to the product. If necessary, solid granules 23, other than the coarse granules 16, may be wetted with enough syrup to prevent dust and added to the surface of the bed by spreader 22, entering with selected coarse granules 20 by merging with the flow thereof as indicated by arrow 35.

The partial schematic showing of the lower part of fixed bed dryer D, FIG. 2, corresponds to the schematic representation of the same dryer in FIG. 1, and in which the same elements have the same numerical designations. The dryer includes a bin indicated generally at 41 formed by an outer cylinder or outer cylindrical, insulated bin wall 36 which rises from an imperforate horizontal bottom wall 37, and which is covered by roof 29 (not shown in FIG. 2). Centered within the outer cylindrical wall 36, which may have a diameter on the order of 24 feet, is a second, inner cylinder indicated generally at 40, of a diameter of about 6 feet. Extending horizontally above the imperforate bottom wall 37 is a perforated floor 39 supporting a bed of dried granules and syrup 7 which lays over a layer of corn 38 about 2 inches in thickness. Heated air 25 enters inlet 26 to fill the lower plenum chamber 6. The second, or inner cylinder 40, is divided into three sections. Bottom section 40a is a structural member of the dryer frame, while mid-section 40b and top section 40c rotate with the auger-cutter 11 and the mixer-sprayer 10, respectively. The edges of the various sections 40a, 40b, 40c overlap, tending to sealably separate the interior of the inner cylinder 40 from the annular space between that cylinder and the outer cylindrical insulated bin wall 36.

Figure 3:
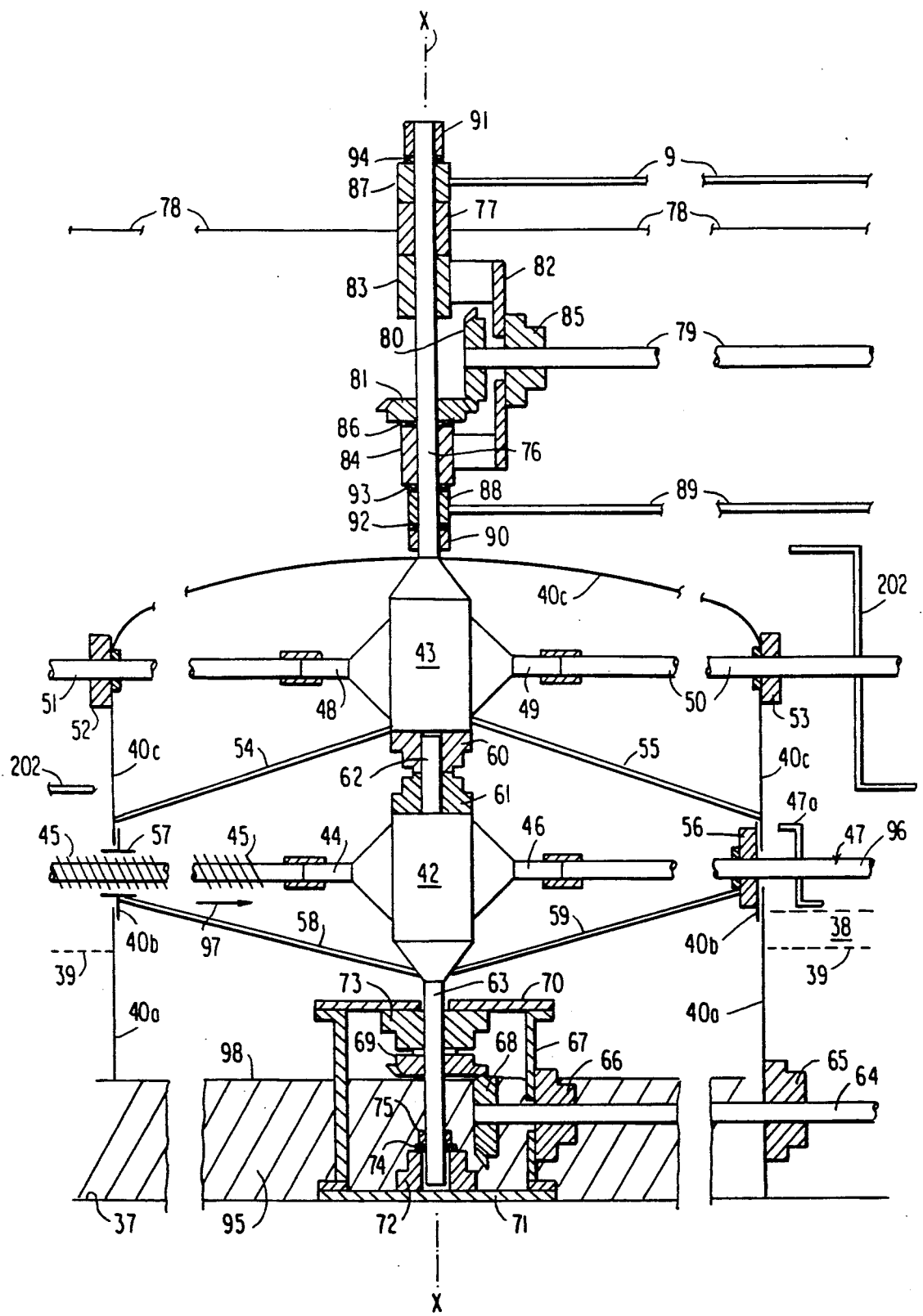
FIG. 3 is an enlarged, more detailed schematic, vertical sectional view of the center of the fixed bed dryer of FIG. 2.

The partial schematic showing of the center of the fixed bed dryer D, FIG. 3, corresponds to the schematic of FIG. 2, of the inner cylinder indicated generally at 40. The fixed bed dryer D is provided with a lower gear box 42 internally of inner cylinder 40 and an upper gear box 43, physically mounted to and above the gear box 42, and within the same cylinder 40. Gear box 42 is coupled directly via shaft 44 to a variable pitched and tapered auger 45 to the left of gear box 42, and via shaft 46 is coupled directly to cutter 47 on the right of gear box 42. Cylindrical section 40b rotates with gear box 42. Section 40b is supported by the shaft of cutter 47 as it passes through 40b via bearing 56 and by the variable pitched, tapered auger 45 as it passes through 40b via duct 57. Angle iron braces 58 and 59 extending radially from the frame of gear box 42 to the base of section 40b also support section 40b.

Gear box 43 is coupled directly via shafts 48 and 49 to mixer 50 on the right and mixer 51 on the left of gear box 43. Cylindrical section 40c is supported on top of gear box 43 and rotates with gear box 43. Section 40c is further supported by mixer 51 as its shaft passes through the wall of 40c via bearing 52 and by mixer 50 as its shaft passes through the wall 40c via bearing 53. Cylindrical section 40c is further stiffened by angle iron braces 54, 55 extending radially from the frame of gear box 43 to the bottom edges of wall 40c.

Power is supplied to gear box 42 via shaft 64. A motor (not shown) outside of the dryer D is coupled to shaft 64. Shaft 64 passes through cylindrical section 40a via bearing 65 and inner frame member 67 via bearing 66. Miter gears 68 and 69 transfer power from shaft 64 to shaft 63 of gear box 42.

A key aspect of the present invention, both in terms of the embodiment illustrated in FIGS. 2–3, and that in FIGS. 4–8, inclusive, has to do with the powering and action of the mixers 50 and 51. Gear box 43 rests upon and is bolted to combination flange and thrust bearing 60. The top of gear box 42 is bolted to combination flange and thrust bearing 61. Shaft 62 is placed in the bore of bearings 60 and 61 to maintain alignment of the two gear boxes. Shaft 62 is not connected with either gear box. Shaft 62 rotates freely within the bearings, thereby enabling the two gear boxes 42, 43 to rotate at different rpms.

Power is transmitted to gear box 43 by shaft 79 which is coupled to a motor (not shown) outside of dryer D. Miter gears 80 and 81 transfer power from shaft 79 to shaft 76 which extends from gear box 43. The alignment of miter gears 80 and 81 is maintained by frame 82 which is a rigid welded form including bearings 83 and 84 on shaft 76 and bearing 85 on shaft 79. Thrust bearing 86 separates miter gear 81 from frame bearing 84.

The alignment of gear boxes 42 and 43 in the vertical orientation is partially controlled by framing members 67, 70, and 71. Frame 67, FIG. 3, is a twelve inch diameter, flanged, schedule 40 steel pipe which is bolted to ½ inch steel plate 71 on the bottom and to ½ inch donut-shaped steel plate 70 on the top. Plate 71 is bolted to the concrete floor 37. Flanged pipe 67 has hand holes (not shown) cut in its side to assist in assembly of the unit. These holes are covered during operations to prevent grains from entering the flanged pipe 67. The hole in the center of plate 70 is just sufficient for the passage of shaft 63. The alignment of shaft 63 from gear box 42 is maintained by bearings 73 and 72 which are bolted to plates 70 and 71 respectively. The alignment is further maintained by bearing 77 which receives shaft 76 from the top of gear box 43. Cables 78 extend from bearing 77 to rigid posts (not shown) outside of the dryer D.

The total weight of the assembly of gear box 42 and 43 is transmitted to the thrust bearing 74, which is resting upon bearing 72, via shaft 63 and collar 75. Upward thrust resulting from the interaction of miter gears 68 and 69 is received by the combination flange and thrust bearing 73.

Syrup is supplied to the dryer D via pipe 9. The syrup flow is from pipe 9 to seal 87 on shaft 76 to a hollow channel within shaft 76 (not shown) to seal 88 to sprayer arm 89. The arm includes a plurality of longitudinally spaced spray nozzles 99, FIG. 2, to cause the spraying of syrup in multiple sprays of conical pattern form, one foot wide, as at 100 downwardly onto the upper surface of the bed 7 of dry granules. The nozzles are sized to apply syrup at a rate proportional to the area the spray will cover as the sprayer arm rotates around the dryer. The sprayer arm 89 is attached to cylindrical section 40c and to speed reducer frame 201 on the end of mixer 50 so that it will rotate around the dryer with these components.

The total assembly along shaft 76 above gear box 43 is held in position by collar 90 at the base of the assembly and collar 91 at the top of the assembly. Thrust bearings 92 and 93 on either side of seal 88 permit shaft 76 and sprayer arm 89 to rotate while the frame 82 is stationary. Thrust bearing 94 permits rotation of collar 91 without the rotation of seal 87.

Dried grains enter inner cylinder 40 via duct 57, FIG. 3 as moved by variable pitched and taper auger 45. The grains accumulate in the base of the inner cylinder and are removed from dryer D by a six inch unloading auger 95, FIG. 2, which extends across the inner cylinder, off center just enough to pass the central frame 67. In FIG. 3, auger 95 passes behind the central frame 67 and is supported on end by a flange bearing (not shown) behind and slightly below flange bearing 65. This auger is powered by a motor (not shown) outside of dryer D.

In this embodiment, the gear box 42 and the midsection 40b of the inner cylinder 40 rotate at a slow rpm such that auger 45 and cutter 47 travel in a circle horizontally in the bottom plane of the bed 7 of granules. The cutter 47 consists of a horizontally disposed shaft 96 having fixed thereto a plurality of cutting knives or blades 47a which are axially spaced along the shaft 96. The granular solids are transported radially in the direction of arrow 97 by rotation of shaft 44, FIG. 3, counterclockwise of the variable pitch tapered auger 45 to pit 98. FIG. 2 through duct 57 within the midsection 40b of the inner cylinder 40 through which auger 45 penetrates for coupling to shaft 44 of gear box 42.

The layer 38 of shelled corn lies beneath the action of both the cutter 47 and the auger 45. The purpose of the layer of shelled corn is simply to help prevent dust particles generated by the action of the auger 45 and cutter 47 from falling through the perforated floor 39 into plenum chamber 6. Further, the layer of corn 38 could be any granular system which yields a stable network of fine air channels permitting air perculation through the bed of dry granules and corn at 7.

Projecting in diametrically opposite directions from gear box 43 are a pair of coaxial mixer shafts 50, 51 which rotate about their axes and support at longitudinally spaced positions mixing knives 202. At the radially outboard end of shaft 50, 51 are mounted for rotation about the shaft axes, 50, 51, wheels 203, 204, respectively, which rest on an annular or ring-shaped rail 205 which is fixed to the inner surface of the insulated, cylindrical bin wall 36. Near the radially outboard end of cutter shaft 50 is a speed reducer 201 which is coupled to mixer shaft 50 via shaft coupling 206. The mixer shaft 50 speed input into the speed reducer is about 1000 rpm and the speed output from the speed reducer is about 30 rpm. The slow shaft 207 of the speed reducer is coupled to rubber wheel 203. A second annular, or circular track 208 is placed about twelve inches above track 205. Coaster wheels 209 and frame members 210 transfer the reaction of the speed reducer to the bottom side of track 208. In a similar manner a speed reducer connects the outboard end of mixer shaft 51 to wheel 204. Wheels 203, 204 rotate the mixer shafts 50, 51, the cylindrical section 40c, and the sprayer arm 89 about the vertical X axis in a circle around the center of the dryer D at seven to ten revolutions per hour. The speed is dependent upon the input speed of shaft 79 which provides power to gear box 43.

In a like manner, tapered and variable pitch auger 45 and cutter 47 extend in diametrically opposite directions from gear box 42 and rotate about their axes. At the radial outboard ends of these shafts are attached directly steel wheels 211, 212 which ride on annular rail 213. Wheels 211, 212 are fluted instead of flat disks so that they dig into the grains tending to pull the cutter 47 and auger 45 in the horizontal direction. As a result of this action of wheels 211, 212 the cutter 47, auger 45, and cylindrical section 40b rotate about the vertical X axis in a circle around the center of the dryer D. The speed of travel is dependent upon rpm of input shaft 64 which supplies power to gear box 42.

The spraying arm 89 is equipped with nine nozzles 99 in this embodiment, with spray patterns 100 covering a band approximately one foot in width. The capacity of the nozzles 99 for a given pressure in the syrup feed line 89 will be in proportion to the area that the nozzle 99 will traverse as the sprayer arm 89 travels around the center of the bin 41. It is not possible to obtain exactly the same rate of syrup application per unit of surface area of bed 7 for each nozzle 99, but the variations will not present a practical problem in the operation of the dryer D. The nozzles require a syrup free of particulates if the desired spray patterns are to be achieved. Screens (not shown) may be employed to remove metal particulates as well as other foreign matter derived from the process equipment if the syrup is hot enough to not be laden with crystalline matter. Syrups heavy in crystallized solids can not be screened. A wet mill (not shown) just ahead of the spray nozzle system may be required to reduce the diameter of particular matter in more viscous syrups. In the first embodiment, as well as the second embodiment, the bed of granules may be divided into three layers. The surface layer L which receives the syrup S application remains near the saturation temperature of the air 25 which enters the base of the dryer at the plenum chamber 6, due to the cooling effect of evaporation. The majority of the granules of this layer tend to remain loose as individual aggregates. Dust emissions are not a problem in the invention because of the moist conditions which always exist on the surface of the bed 7.

The heat efficiency of the drying process is dependent upon the drying air becoming saturated as it passes through the surface layer L of the bed 7. A surface layer of as little as two inches depth is sufficient to saturate the drying air if the moisture levels of the surface exceed 35%. A four inch surface layer is satisfactory if the moisture content of the surface is maintained in excess of 25%.

The moisture content of the surface layer L is manipulated by varying the ratio between the application of syrup S and the addition of dried granules to the surface of the bed via lines 20. 23 in FIG. 1. Moisture content may exceed 35% if no dried granules are added to the top of the bed 7. With this control approach, the surface moisture of the granules may become excessive causing granules to be tacky and a build-up of solids on the mixers 10.

The moisture content of the surface layer of the bed 7 may be reduced by recycling dried granules from the bottom of the bed via line 20 to the top of the bed, or by adding dried granules to the surface of the bed which are obtained from some other source, as per arrow 23. FIG. 1. For example, when drying distillers syrup. DDGS with a low dried syrup content may be added to the surface of the bed 7 and the granules from the bottom of the bed would be retained as a DDGS product with a high dried syrup content.

As granules move below the bottom of the mixing zone, that is in the direction of the variable pitch tapered auger 45 and the cutter 47, the temperature of the granules rises, approaching the temperature of the incoming air 25. The solids tend to bind, forming a cake. The ratio of syrup to solid granules must be controlled so that this cake remains porous to air movement and is easily crumbled when the cake encounters the cutter 47.

The possible thickness of the middle layer M of granules is limited by the porosity of the cake which may form. When drying distillers syrup on distillers grains, a thickness of one to two inches is appropriate when the bed surface moisture content is held near 35%. A thickness of five inches or more is possible when the surface is held to about 25% moisture.

It is important that the dwell time for material in the middle layer M be sufficient for the moisture content to approach that of the final product before the solids drop into the layer mixed by the cutter. When drying distillers syrup, the moisture content at the bottom of the middle layer should be approaching 12% or less.

The third layer N is composed of granules within the action of the cutter 47 and the variable pitch tapered auger 45. As solids are removed from the bottom of the bed 7, the cake slowly comes into contact with the outer peripheral edges of the blades 47a of the cutter 47. The variable pitch tapered transport auger 45 removes a layer of about one-fourth of an inch thickness from the bottom of the bed 7 with each rotation of the assembly around the bin 41. This results in the cake dropping about one-fourth of an inch into the action of the cutter 47 with each rotation. The cutter then shaves off the bottom surface of the cake and mixes it with other solids in the bottom plane of the bed above the layer of corn 38.

The moisture content of the product removed from the bottom of the bed and which accumulates momentarily within pit 98 prior to removal as evidenced by arrow 12, FIG. 2, via unloading auger 46, is an average of the moisture levels which exist in the auger-cutter layer. The solids near the bottom of the bed will always be about 4% moisture. Solids from the bottom of the cake of the mid-zone M will be near 12%. The cutter 47 mixes these materials, generating the final product. A cutter 47, whose blades are four inches in diameter, is a practical size for the bottom of the bed 7. A bed of this thickness provides enough dwell time for the final product to be of 7% moisture or less Effective control of the process maintains a balance between the solids which will flow through the bed as described above and the need to minimize the total time protein will be exposed to the temperature of the air 25 entering the dryer Recycling of solids to the top of the bed may be necessary as per lines 34, 35, FIG. 1 to maintain fluid conditions in the top and bottom layers of the bed, and a porous cake in the middle layer or zone M of the bed. This also increases the time of exposure of protein to the higher temperatures of the dryer and the sizes of equipment required to handle the solids throughout the process.

Prior to discussing specific examples and the parameters of process control, both of which are applicable to either a fixed bed dryer as at D; FIG. 2, or a rotating bed dryer D' as per FIGS. 4–8, inclusive, the structural make-up and details of the alternative rotating bed dryer D', FIG. 3, will be described, in which case the rotating bed dryer D' substitutes for that of D, FIG. 1.

In the second embodiment, the Figures disclose components of the rotating bed dryer D' necessary to operate under the process parameters in sufficient detail to permit one to practice the invention. As may be appreciated from reference to FIGS. 4–8, inclusive, in this embodiment the bed indicated generally at 100 is rotated, while the other components of the apparatus, i.e..

the mixer indicated generally at 101, the cutter indicated generally at 102, the sprayer indicated generally at 103, and the variable pitched and tapered auger indicated generally at 104 are fixed. The mechanics of the system are much simpler if the bed is rotated and these other components remain stationary. The top plan schematic view of FIG. 5, while illustrating the structural support of the rotating bed and the major elements thereof, also gives an appreciation of the nature of the fixed bed dryer which is shown solely in a vertical sectional view. FIG. 2, since the components are common and the difference resides in the fixing of the bed and the rotating of the other major components, as per FIG. 2, in contrast to the rotating bed embodiment.

Figure 4:
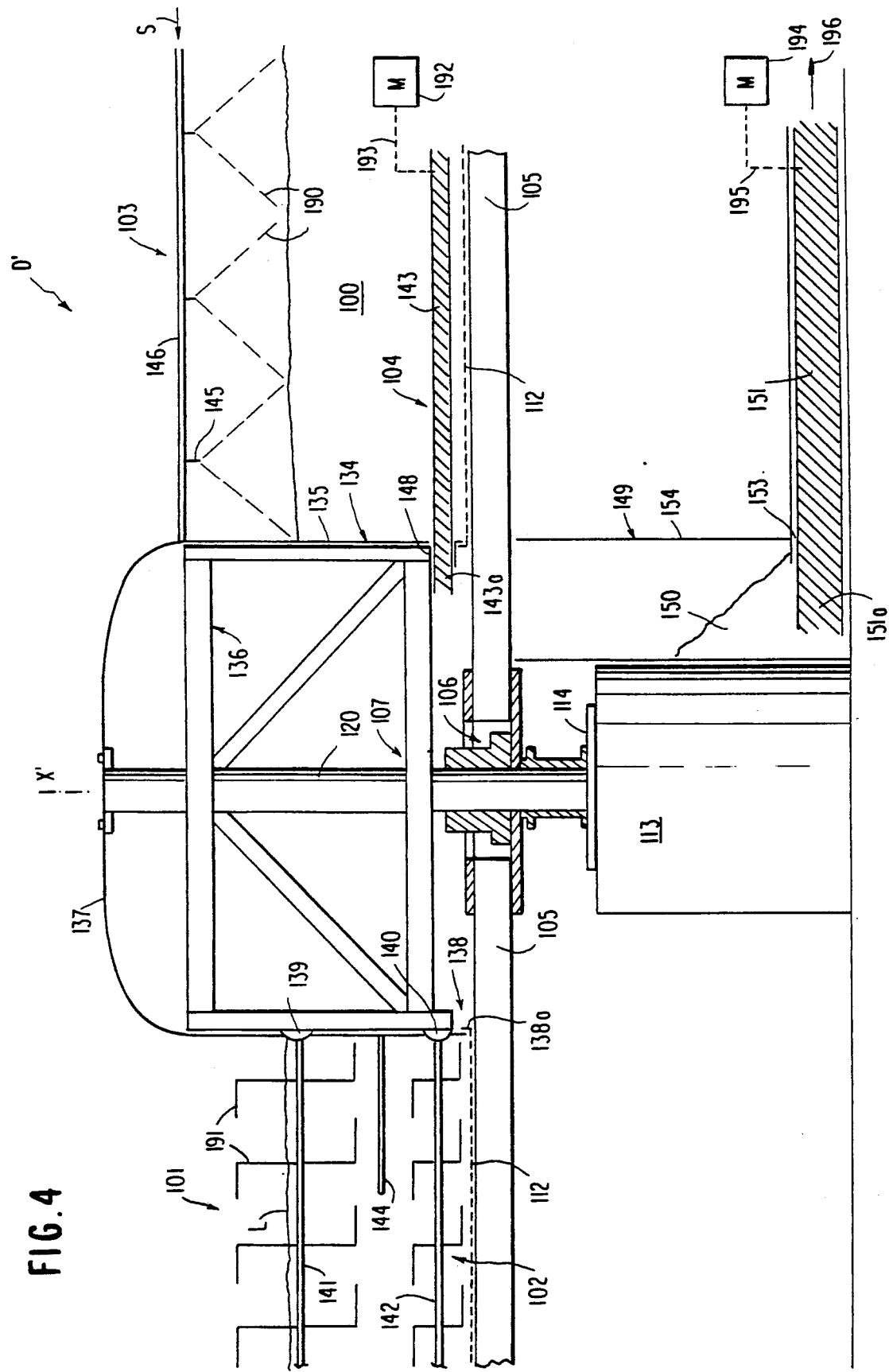
FIG. 4 is a vertical sectional, schematic view of a rotating bed dryer in a preferred embodiment of the invention substituted with the apparatus illustrated in FIG. 1, for the fixed bed dryer.
Figure 5:
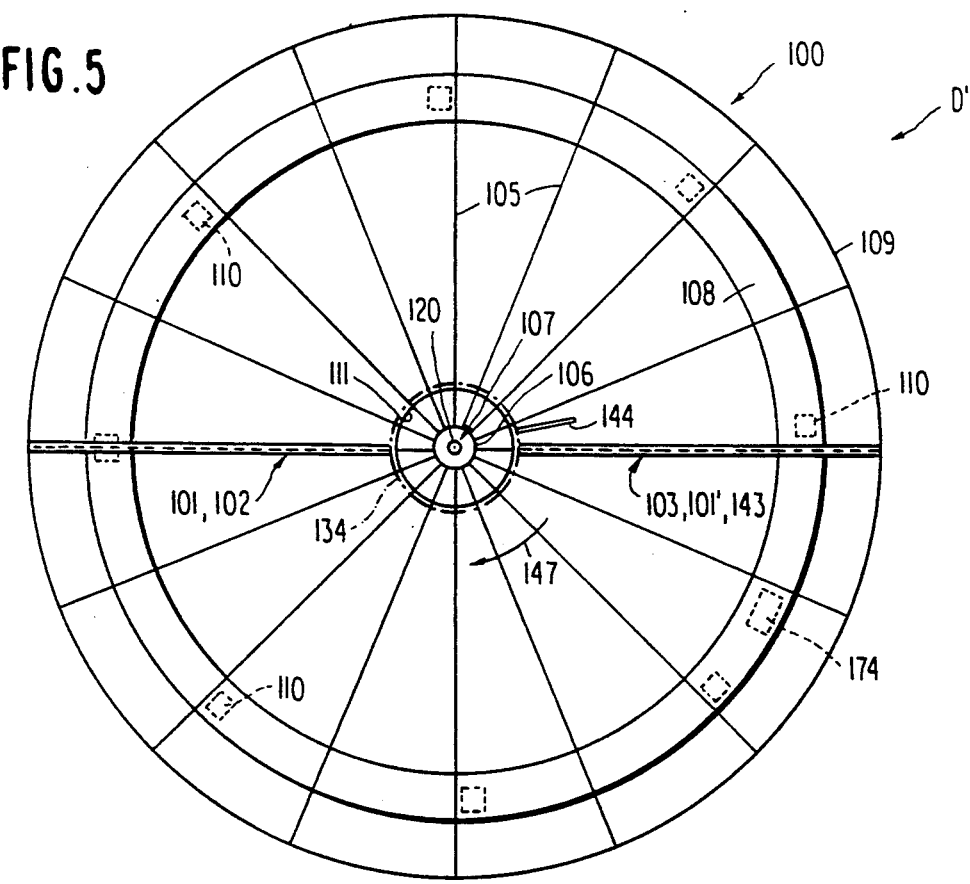
FIG. 5 is a schematic plan view of the rotating bed of the rotating bed dryer of FIG. 4.

In the top plan schematic view of FIG. 5, the bed 100 is supported by sixteen I-beams 105 which form radii from a central hub 106 to the outer edges of the bed 100. An annular track 108, FIG. 5, is located two feet from the outer edge 109 of bed 100 and supports the outer ends of the radial I-beams 105. The track rests upon ten rollers indicated schematically at 110. The track serves as the major structural component in holding the I-beams in the appropriate orientation. The track 108 supports the load between the rollers. An inner ring 111 acts in conjunction with outer ring 109 to provide support for the edges of the perforated floor 112, FIG. 4, which rests upon this structure. Rotation of the rotating bed 100 of the rotating bed dryer D' is achieved by the use of a drive wheel 174 which is aligned with the track. The I-beams 105 may be 3×2.375 inch American standard steel beams. The track 108 is made from two 4×4 inch American standard steel angle bars, FIG. 7.

Figure 6:
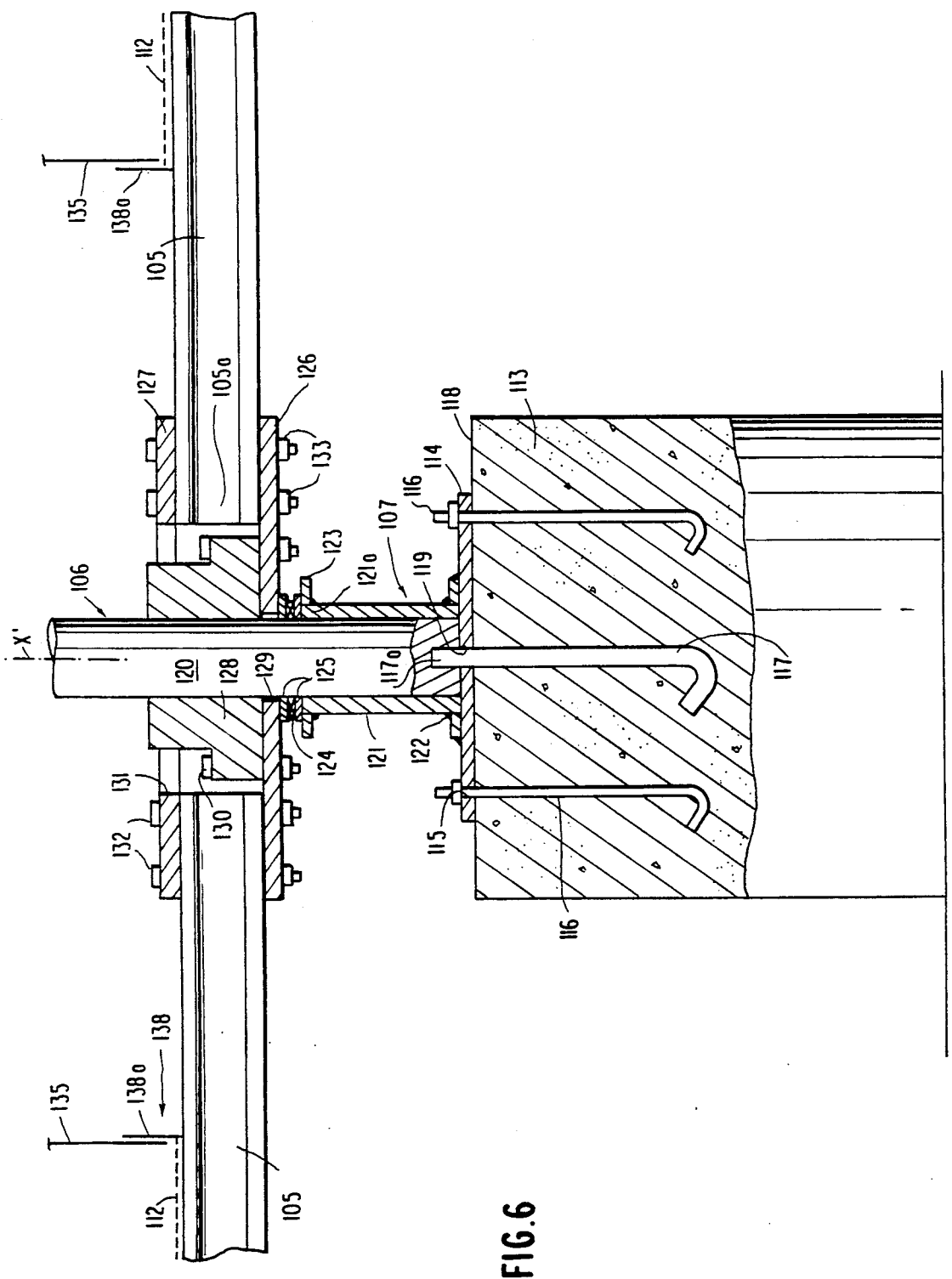
FIG. 6 is an enlarged, vertical sectional, schematic view of the central pivot and hub of the rotating bed dryer of FIG. 4.

The details of the make-up of the central pivot 107 and the central hub 106 mounted thereto for rotation thereabout may be seen in FIGS. 4, 6. The central pivot indicated generally at 107 rests upon a reinforced concrete cylinder 113 which is eighteen inches in diameter and eighteen inches in height, for example. A one-half inch thick steel plate 114 provided with bolt holes 115. FIG. 6. is fastened to the concrete cylinder 113 by three-quarter inch diameter J-bars 116. A single, one inch J-bar 117 is embedded in the cylindrical concrete cylinder 113 and has a vertically projecting end 117a which projects above the top surface 118 of the cast concrete cylinder 113. End 117a passes through a central hole or opening 119 within the plate 114. In the illustrated embodiment, a 3.25 inch diameter steel shaft 120 is threaded onto the J-bar 117 to form the major component of the central pivot 107.

A 3.364 inch inside diameter by six inch long flanged, schedule 80 steel pipe 121 is placed over the central pivot shaft 120, and is welded at 122 to the base plate 114. Pipe 121 is capable of carrying a 6,000 lb. vertical load of the center of the structure rotating about central, vertical axis X'. The upper end 121a of the steel pipe 121 with its flange 123 is preferably planed smooth to provide a suitable support for thrust bearing 124 sandwiched by a pair of thrust washers 125. The thrust bearing 124 may be rated at a static load of 26,000 lbs., which is appropriate since the rotational speed of the rotating bed is preferably on the order of about 8 revolutions per hour. The concrete cylinder 113 rests on the bottom wall or floor 37, at the center of the rotating bed dryer 9 D'.

The central hub indicated generally at 106, FIG. 6, is illustrated in detail as being constructed with two donut-shaped, three-quarter inch steel plates 126 and 127, and a flanged bearing 128. The outer diameter of the two plates 126, 127 may be eighteen inches. The lower, or base plate 126 of the hub 106 rests directly on the upper thrust bearing washer 125. The base plate 126 is provided with a central hole 129 which is sized in excess of the diameter of shaft 120 of the central pivot 107.

The flanged bearing 128 is bolted to the central hub base plate 126 via bolts 130. This permits the hub 106 to rotate around the central pivot 107. The upper or top plate 127 of the hub 106 has a central hole 131 of sufficient diameter to provide clearance for the flanged bearing 128, which projects through the hole 131. The inboard ends 105a of the I-beams 105 are sandwiched between the two hub plates 126, 127 by a plurality of bolts 132. Nuts 133 are carried by bolts 130 and 132. As clearly seen in FIG. 6, the inner peripheral edge of annular perforated floor 112 is supported directly by the I-beams 105 spaced radially outwardly from the central pivot 107 and central hub 106.

Looking again to FIG. 4, the air seal over the central pivot is illustrated in detail. The center structure of the rotating dryer D' is covered by a cylindrical cover indicated generally at 134, having a cylindrical vertical wall 135 which houses a central frame structure 136 which is fixed to and includes the fixed steel shaft 120. The vertical axis cylindrical wall 135 extends down to within one inch of the perforated floor 112. A domed cap 137 completes the cover 134. The cover or vessel 134 prevents the flow of drying air through the center of the rotating bed dryer D'. A first labyrinth-type seal indicated generally at 138, FIGS. 4, 6 insures that any air which escapes the center of the dryer D' must flow into the bed of grains to be dried by passing between the overlapping lip 138a at the inner peripheral edge of the perforated floor 112 and the vertical cylindrical wall 135 of the cover 134, FIG. 6 forming seal 138.

The central pivot defined principally by vertical shaft 120 extends above the central hub 106 to provide the support for the stationary components in the center of dryer D', FIG. 4. Frame structure 136 inside the central cover or cap 134 is welded to the shaft 120 of central pivot 107.

The frame structure 136 maintains the orientation of central cap or cover 134 and provides support for bearings 139 and 140 for the ends of respective mixing and cutting shaft 141, 142 of mixer 101 and cutter 102. The bearings 139, 140 are mounted to the central cap 134 and rotatably support the shafts 141, 142 for horizontal rotation about their respective axes.

In like manner as shown in the top view of FIG. 5 but not in the schematic view FIG. 4, mixer 101' extends diametrically opposite mixer 101 to the right of the central cap 134. Additionally, the inner end 143a of the bottom unloading auger 143 is supported by the central cap or cover 134. As illustrated schematically in FIG. 5, the temperature probe and its guard 144 are also attached to the fixed, central cap 134. Cables (not shown), run from the frame structure 136 to the outer peripheral wall 36 of bin 41, FIG. 2, with the bin 41 being retained in the second embodiment, and in which only a rotating bed dryer D' is substituted for the fixed bed dryer illustrated in FIG. 2. In this instance, the cables assist in maintaining the proper orientation of the central cap 134.

Further reference to FIG. 5 shows the angular orientation of mixer 101 and companion mixer 101', cutter 102 and companion bottom unloading auger 143 to opposite sides of the central cap 134, sprayer 103, and temperature probe 144. The diametrically opposed mixers 101, 101' extend respectively on opposite sides of the central cap 134. The cutter 102 is located directly beneath the mixer 101. Auger 143 is located directly beneath the right side mixer 101'. Preferably the spray nozzles 145 of sprayer 103 are parallel to the mixer 101', and one foot ahead of the mixer 101'. Preferably the temperature probe and its guard 144 are two feet ahead of the sprayer arm 146 of sprayer 103. The bed rotates in a clockwise direction, looking down onto the assembly, FIG. 5, as per arrow 147, so that the surface of the bed 100 is sprayed just before it enters the area of contact with mixer 101'.

Dried syrup is removed as a uniform layer from the cake, across the bottom of the drying bed 100 by variable pitched and tapered auger 143 as the bed rotates, FIG. 4. The auger 143 pulls dried granules through a circular opening or hole 148 within vertical axis, cylindrical wall 135 of the central cap 134. The dried granules fall through the open space of the central hub 106 and the inner peripheral edge 138a of the perforated floor 112 into a cylindrical collection vessel 149. The granules 150 are removed from the collection vessel by unloading auger 151 which may be structurally identical to auger 95, FIG. 2. As such, the cylindrical wall 154 of collection vessel 149 through which projects the radially inboard end 151a of the unloading auger 151.

In the embodiment of FIGS. 4–8, inclusive, like elements are provided with like numerical designations. In that respect, the outer cylindrical insulated wall 36, FIG. 7, physically supports an inner cylindrical liner 155 which, in turn, supports bearings 156, 157 via liner braces 158 interposed between the cylindrical liner 155 and the outer cylindrical insulated wall 36. Power is supplied to the cutter 102 through shaft 159 from a drive motor 160 supported by bearing 157 with the motor output shaft 159 coupled directly to the shaft 142 supporting cutting blades 161 at longitudinally spaced positions.

A separate motor 162 has its output shaft 163 coupled directly to shaft 141 of the mixer 101 through bearing 156. In like manner (not shown) on the diametrically opposite side of the bin 41 the shafts of mixer 101' and transport auger 143 extend through the wall 36 and are coupled to appropriate motors.

Figure 7:
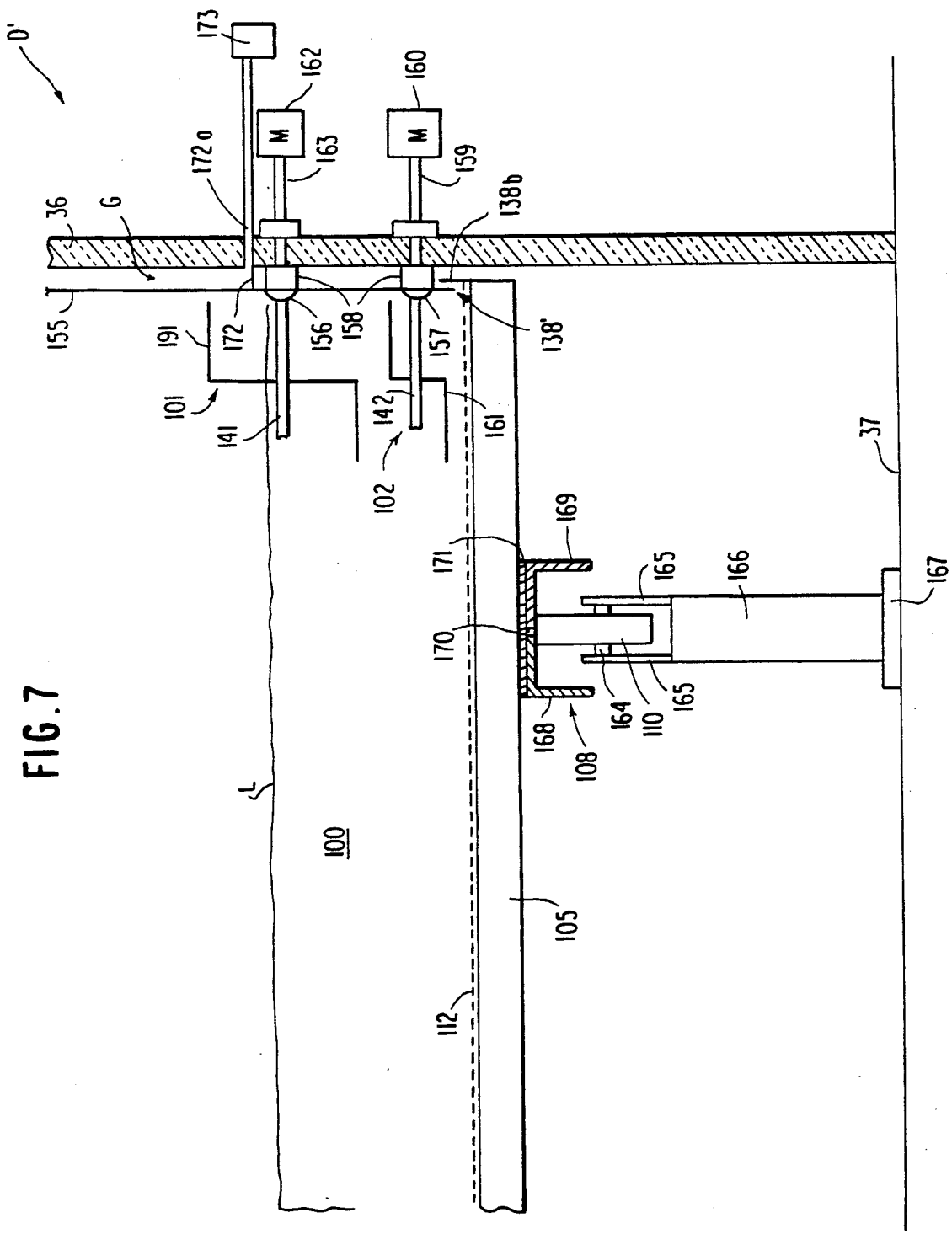
FIG. 7 is an enlarged, vertical sectional view of a portion of the rotating bed dryer of FIG. 4, illustrating the details of the outer air seal, the track and supporting rollers for the rotating bed thereof.

FIG. 7 also illustrates the mechanism for supporting the array of I-beams for rotation of the bed 100 about the axis X' of the rotating bed dryer D'. The track 108 is shown in the vertical sectional view as being supported by one of the rollers 110 mounted for rotation about a horizontal axis via axle 164 with the axle 164 supported at opposite ends by laterally spaced risers 165 which extend upwardly from a steel post 166. The steel posts 166 are bolted to the concrete foundation of the dryer as exemplified by floor 37 and pads 167. The steel rollers 110 may be eight inches in diameter and 2.3 inches wide. The continuous load rating is 3,000 lbs. The actual load on the track 108 is about 12,000 lbs., or only 1,200 lbs. per roller. The static friction force under this load is about 2 lbs. per roller.

The track 108 as seen from FIGS. 5 and 7, is constructed by bending 4×4 American standard steel angle bars to form two annular, mirror image donuts. Tracks consist, therefore, of a radially inner donut 168 and a radially outer donut 169. The inner donut 168 in the Example has a maximum diameter of 20 feet. The outer donut 169 is built so as to just fit around the inner donut, with an inside diameter of approximately 20 feet. These form the circular channels providing a track which is eight inches in width. The seam 170 between the two angle bars 168, 169 may be reinforced by welding a one-quarter inch steel plate 171 to the back side of the angle bars between the radial I-beams 105. The radial I-beams 105 are welded directly to the track.

FIG. 7 also illustrates the details of the outer edge of the rotating bed dryer D'. An air seal is provided between the rotating bed 100 and the outer wall 36 of the rotating bed dryer. The outer edge of the rotating bed is provided with the vertical lip 138b rising approximately two inches above the perforated floor 112 of the dryer D'. The inner cylindrical liner 155 is located two inches inside of the fixed outer insulated wall 36 and extends from one-half inch to 24 inches above the perforated floor 112. The gap G between the liner 155 and the fixed outer insulated wall 36 is sealed at 172. The overlapped liner 155 and the lip 138b form a second labyrinth-type seal 138 between the rotating bed 100 and the inner cylindrical liner 155. Air movement is therefore through this labyrinth-type seal 138', defined by the overlapping lip 138b and liner 155 into the bed of granules supported by the perforated floor 112.

The water of condensation on the walls of the dryer D will drain to the channel above seal 172. The water then drains from the system through a vapor trap 173 via duct 172a.

Figure 8:
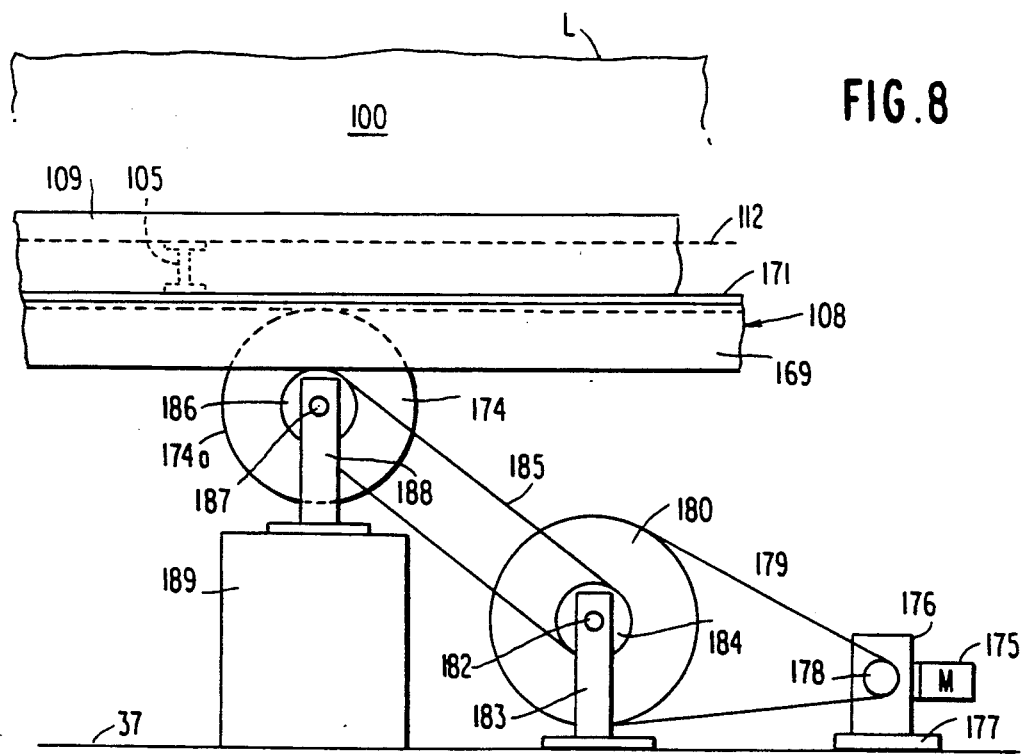
FIG. 8 is a schematic view of the rotating bed drive system for the rotating bed dryer of FIG. 4.

Turning to FIG. 8, the driver for the rotation of the bed 100 is illustrated schematically in some detail. The rotating bed 100 is driven at a very slow velocity, for instance, on the order of 6 to 8 revolutions per hour. Based on the friction of the bearings of the rollers 110 and the torque associated with the diameter of the rollers 110, the total static friction force due to the rollers at the intersection of the track and the drive wheel 174 is about 10 lbs. The drive wheel 174 in the Example is 12 inches in diameter. A 12 inch diameter drive wheel 174 results in a minimum of 60 inch/pound of torque to overcome the friction of the rollers 110. The drive mechanism is designed for a torque in the Example of 1,000 inch/pounds at the intersection of the drive wheel 174 and the track 108. Other sources of torque would be the friction between the particles of the drying bed 100 and the central cap 134; the cutting action of the guard in front of the temperature probe 144; and the friction between the rotating bed 100 and the liner 155 along the outer wall 36. The torque due to the friction of the bearings 106 in the central pivot 107 is not significant.

The power for rotation of the bed 100 is provided by a one horsepower DC variable speed motor 175 directly coupled to a gear box 176, supported by pad 177 on floor 37. The motor 175 is flange-mounted to the gear box 176. The gear box has a 60:1 speed ratio, and 2,000 inch/pounds capacity in the exemplary embodiment. The gear box output shaft supports a two inch diameter chain sprocket 178. Leaved about the sprocket 178 is a drive chain 179, which engages a 12 inch diameter sprocket 180 mounted for rotation about a horizontal axis by way of intermediate shaft 182 on a pedestal support 183. The intermediate shaft 182 also supports a 4 inch sprocket 184. The chain drive via chain 179 between sprockets 178 and 180 causes an overall speed reduction ratio of 360:1. The 4 inch sprocket 184 is connected via a second chain 185 to a further 4 inch diameter sprocket 186 mounted for rotation by way of shaft 187 for driving that shaft and the drive wheel 174 affixed thereto. Pedestal support 188 is mounted on a support block 189, such that the periphery 174a of drive wheel 174 contacts the track 108 to drive the track and thus the bed 100 at the speed of 6 to 8 revolutions per hour. The drive wheel 174 is preferably a pneumatic tire whose pressure may be adjusted to obtain the proper friction between periphery 174a and track 108.

The operation of the rotating bed dryer D is very similar to that of the first embodiment, since the rotating bed dryer D' is merely substituted for the fixed bed dryer D. In the second embodiment, all of the remaining components are similarly employed, although in this instance it is only the bed 100 which rotates, driven in the manner of FIG. 8. Again the feed of syrup S to the interior of the rotating bed dryer D' is through a sprayer tube 146 from a source as indicated by arrow S, FIG. 4, which projects radially inwardly from the insulated bin wall 36. In this instance, the hollow shaft and seals of the first embodiment are not required, since none of this structure rotates. The longitudinally spaced spray nozzles 145 along the length of the sprayer tube 146 causes the spraying of syrup S in multiple sprays of conical pattern form as at 190, FIG. 4. The rotation of mixer blade 191, FIGS. 4, 7, is effected by energization of motor 162 and rotation of the mixer shafts 141. Diametrically opposite mixer 101 on the opposite side of fixed center cap 134 mixer 101', not shown in FIG. 4, is identical to mixer 101 and is energized by another motor. The drive of the cutter blades 161 by rotation of cutter shaft 142 upon energization of drive motor 160 removes the bottom surface of the cake of bed 100 in the same manner as in the prior embodiment, and operation of the bottom unloading auger 143 proceeds, driven by yet a fourth motor 192, mechanically connected as at 193 to the auger. FIG. 4. The make-up and operation of the auger is identical to that of the first embodiment and the action is to effect the discharge radially inward of the cut granules 150 for accumulation within the collector vessel 149 as per FIG. 4. Unloading auger 151 which may be driven by a further, separate motor 194, through a mechanical connection indicated schematically at 195 insures the unloading of the collection vessel 149 by discharging of the particles radially outward, as indicated by arrow 196. FIG. 4, with the cut granules discharging in the manner of arrow 12, FIG. 1, from bin 41. The further description of the operation in a generic sense appearing throughout applicants, specification directed to the first embodiment using fixed bed dryer D, at pages 16-20, inclusive, applies equally to the embodiment of the invention wherein the rotating bed dryer D' is substituted for the fixed bed dryer D.

Examples of Employing Either The Fixed Bed Dryer or the Rotary Bed Dryer

The following examples are applicable to either the dryer D of FIG. 2, or the dryer D' of FIG. 4. In the examples, as may be appreciated, the composition of distillers syrup and physical properties of dried syrup vary considerably and the technique of operation or the dryer and its operating parameters under the process and through the apparatus of the present invention may vary accordingly, without departing from the scope of the invention.

Example 1

Syrup obtained directly from an evaporator containing about 33% solids was easily dried on distillers grains, to obtain syrup content in the DDGS near 90%. DDGS of low dried syrup content was slowly added to the top of the bed. Dried granules were drawn from the bottom of the bed and exiting as at arrow 12. FIG. 1, were recycled in accordance with arrows 34, 35, FIG. 1, to maintain a moisture content in the top of the bed of about 25%.

Example 2

Samples of distillers syrup were taken from a tank where the distillers syrup had been stored for a number of years. Crystallization and sedimentation had occurred within the tank. One sample from the tank consisted of a brown slurry containing 27% solids. A second sample has a clear but black liquid containing 22% solids. These samples were dried to obtain DDGS with about 70%-80% dried syrup, employing the apparatus as set forth in FIG. 2, minimal quantities of granules were recycled from the bottom to the top of the bed in accordance with the process flow chart as per 20, 34-35, FIG. 1.

In this case, the dried syrup content of the DDGS was limited by the tendency of the product to cake after grinding. The product from the brown slurry tended to cake when, the product was stacked in bags to a height of six feet. The meal consistency of this product in bags taken from the bottom of the stack were recovered by dropping the bags onto the floor. The product from the dark liquid was much more difficult to handle. During storage it formed hard cakes which were difficult to return to a meal consistency. More DDGS low in syrup or other granular material such a wheat bran may be added during the drying of the darker syrup stock.

Under process control parameters of the present invention the balance between the rate of solids accumulation in the top layer of the bed and the rate of solids removal from the bottom of the bed is accomplished preferably by electronic controllers. The rate of solids removal is preferably controlled by moderating the temperature in the bed at a position beneath the mixers 10, FIG. 2, and above the cutter 47. From the top of the bed downwardly, there is a rapid increase in temperature, as drying is characterized by the diffusion of water from the interior of granules rather than evaporation from the moist films on the surface of granules. Control is achieved by holding the temperature at the monitoring point midway between the surface temperature of the bed 7 and the temperature of the air 25 as it enters the bottom of the bed from air plenum chamber 6. As the set point is exceeded the rate of the removal of solids increases. Conversely, as the temperature drops below the set point, the rate of removal is decreased. The rate of removal is set manually near the balance rate by a variable pitch pulley (not shown) on the motor drive. With a variable speed drive motor, not shown, connected directly to shaft 64 of FIG. 3 or motor 192 connected directly to shaft 143 of FIG. 4, closer control is obtained of the shaft of the unloading auger 45, FIG. 3 or unloading auger 143, FIG. 4.

A milliamp signal from the temperature controller to the motor speed controller regulates the rpm of the unloading auger 45 of FIG. 3 or 143 of FIG. 4.

The wet bulb and dry bulb temperature of air 25 is held steady by electronic controllers. The wet bulb temperature is monitored as air leaves steam coil 5 of FIG. 1. A milliamp signal increases the flow of recycled air 2 when the wet bulb temperature of air 25 drops below the set point and decreases recycled air flow 2 when the wet bulb temperature of air 25 is above the set point. The dry bulb temperature of air 25 is monitored as air 25 leaves steam coil 5 of FIG. 1 A milliamp signal increases steam flow 24 when the dry bulb temperature is below the set point and decreases steam flow when the dry bulb temperature is above the set point.

The rate of syrup additions to the top of the bed 7 is controlled by monitoring the differential air pressure drop through the bed. Syrup is applied by a positive displacement pump driven by a variable speed motor (not shown) and coupled to line 9 of FIG. 3 or line 146 of FIG. 4. The differential pressure transducer sends a signal to the motor speed controller. An increase in pressure drop through the bed 7 indicates either the bed is becoming too deep or that the cake in the middle M of the bed is not porous enough to let the air pass from the lower plenum chamber through the surface layer L of the bed 7. A controller (not shown) functions to reduce the syrup application rate when the pressure set point is exceeded, by reducing the speed of the syrup pump motor. Conversely, syrup application is increased as the pressure drops below the set point. Pivotal control condition involves a pressure drop through the bed of about four inches of water when the air flow is about 60 cfm per square foot.

The application of recycled granules or other granules to the top of the bed may be controlled by a weight activation switch and a timer. The cycle begins with the filling of the spreader 22, until the weight sensor turns off the flow to the spreader. The spreader 22 is then turned on at an appropriate time by a timer (not shown). The timer turns off the spreader when it is empty and turns on a supply auger to the spreader (not shown) to prepare for the next cycle. Granules are added to the top in a definite ratio to the rate of syrup application. Reference to FIGS. 4–8, inclusive, may be had for the apparatus of the present invention, as in a preferred embodiment form in which a rotating bed dryer D' is employed as a substitute for the fixed bed dryer D of FIG. 1. For purposes of illustration, it can be considered that the outer insulated bin wall 36, the bottom wall 37 and the cover or hood 29 has been retained along with heated air inlet 26, gas outlet or exhaust 27, and the outlet for the unloading auger to remove the dried granular powder as indicated schematically by arrow 16 of FIG. 1. The apparatus components of FIG. 1 other than the substituted rotating bed dryer D' have been retained, and the process parameters are essentially identical.

It will, of course, be understood that various changes may be made in the form, arrangement and details of the apparatus and in its method of operation, without departing from the scope of the invention, which, generally stated, consists in the manner shown described and set forth in the appended claims.

What is claimed:

1. In a process for drying suspensions or solutions of solids to obtain a granular solids comprising the steps of; supporting a bed of saturated granular solids on a perforated floor, passing heated drying air through the bed of solids to dry the solids by vaporization of the liquid content and removing the lower layer of granular solids from the bottom of the bed while replacing saturated granular solids on the top of said bed, the improvement comprising the steps of:

continuously spraying a concentrated liquid to be dried as a syrup over the upper surface of said bed, mixing the syrup into the bed of the granular solids, and controlling the moisture content of the upper surface layer of the granular solids by varying the ratio of applied syrup to added dry granules to the upper surface of the bed and by varying the flow rate and/or heat content of the drying air to cause the upper surface layer of the granular solids of the bed bearing the sprayed syrup to be at near saturating temperature of the air being applied to the granular solids through the perforated support due to the cooling effect of evaporation of the liquid content of the saturated grains thereof whereby said dried syrup content of the granular solid removed from beneath the bed is increased by a percentage of up to nearly 100% over the normally achievable for drying suspensions or solutions of solids to obtain granular solids.

2. The process as claimed in claim 1, further comprising the step of mixing the upper surface layer of granular solids of said bed while spraying syrup into the upper surface layer of granular solids.

3. The process as claimed in claim 2, wherein said step of removing the lower surface layer of the bed of granular solids comprises cutting the lower surface layer of the bed of granular solids by applying a rotating cutter to that surface, and transporting the cut, dried solids from the area beneath the bed by a rotary variable pitched and tapered auger.

4. The process as claimed in claim 2, wherein said bed is a fixed bed, and said step of spraying syrup on the upper surface layer of the bed of granular solids comprises rotating a sprayer arm extending radially from the center of the bed about the bed and over the upper surface layer of the bed and spraying said syrup through a plurality of longitudinally spaced sprayer heads carried by said sprayer arm as the arm rotates angularly about the center of said bed, and said step of mixing the upper surface layer of the bed of granules comprises rotating a plurality of longitudinally spaced cuter blades affixed to a cutter shaft about the axis of the shaft and extending radially, parallel to said bed upper surface layer while moving the cutter shaft through said bed of dried solids within the upper surface layer thereof angularly about the center of the bed to mix the granular solids at the upper surface of the bed with the syrup impinging thereon via said rotating sprayer arm.

5. The process as claimed in claim 2, wherein said bed is a rotating bed, and wherein said perforated floor underlying said bed of granular solid is rotated about a vertical axis passing through the center of the bed relative to a fixed sprayer arm extending radially from the center of the bed to the edge of the bed, perpendicular to said axis and bearing a plurality of longitudinally spaced sprayer heads facing the upper surface layer of the bed of dried solids, and wherein a mixing cutter has a cutter shaft extending radially, and parallel to the perforated floor, within the upper surface layer of the bed, and bearing a plurality of longitudinally spaced cutter blades and is rotated about its axis at a fixed position relative to a sprayer arm, and downstream thereof for effective mixing of the syrup into the granular solids dislodged at the upper surface layer by rotation of the mixing cutter shaft relative to the bed.

6. The process as claimed in claim 2, further comprising the step of recycling saturated air leaving the upper surface of the bed of granules into an air plenum chamber beneath the perforated support, and mixing said saturated air with incoming fresh air before heating the mixed air to desired wet bulb and dry bulb temperatures.

7. The process as claimed in claim 6, further comprising the step of removing solid granules from said bed by an auger, milling said solid granules to produce fine grains, removing the fine grains from coarser granules and returning the coarser granules to the upper surface of the bed and spreading said coarser granules over the top of the bed while spraying the concentrated liquid to be dried onto the upper surface of the bed of granular solids.

8. The process claimed in claim 2, wherein said syrup is applied to the upper surface layer of the granular solids of said bed to the extent of providing a moisture level at said upper surface layer in excess of 35% to a depth of at least 2", sufficient to saturate the drying air as the drying air exits from the top surface of the bed of granular solids.

9. The process as claimed in claim 2, wherein the spraying of syrup onto the upper surface layer of granular solids of said bed is controlled such that the moisture content of the upper surface layer is maintained in excess of 25% for over a depth of 4" to cause saturation of the drying air escaping from the surface of the bed of granular solids.

* * * * *